United States Patent

Rode

[11] Patent Number: 6,157,818
[45] Date of Patent: Dec. 5, 2000

[54] COMMUNICATION SYSTEM HAVING AUTOMATIC ADDRESSING

[75] Inventor: France Rode, Los Altos, Calif.

[73] Assignee: Trimble Navigation Limited, Sunnyvale, Calif.

[21] Appl. No.: 09/054,649

[22] Filed: Apr. 3, 1998

[51] Int. Cl.[7] .............................. H04B 1/40; H04Q 7/00
[52] U.S. Cl. ........................ 455/88; 455/500; 455/507; 370/313
[58] Field of Search .......................... 455/11.1, 88, 32.1, 455/420, 452, 31.1, 500, 507, 465; 340/825.54, 825.07, 825.52; 370/313, 349

[56] References Cited

U.S. PATENT DOCUMENTS

| | | | |
|---|---|---|---|
| 4,434,421 | 2/1984 | Baker et al. | 340/825.51 |
| 5,020,094 | 5/1991 | Rash et al. | 455/411 |
| 5,042,083 | 8/1991 | Ichikawa | 455/517 |
| 5,077,790 | 12/1991 | D'Amico et al. | 380/249 |
| 5,495,240 | 2/1996 | Heberle | 340/870.13 |
| 5,530,896 | 6/1996 | Gilbert | 710/9 |
| 5,691,980 | 11/1997 | Welles, II et al. | 370/316 |
| 5,708,655 | 1/1998 | Toth et al. | 370/313 |
| 5,754,780 | 5/1998 | Asakawa et al. | 709/208 |
| 5,764,638 | 6/1998 | Ketchum | 370/401 |
| 5,774,876 | 6/1998 | Woolley et al. | 705/28 |
| 5,852,405 | 12/1998 | Yoneda et al. | 340/825.02 |

*Primary Examiner*—William G. Trost
*Assistant Examiner*—Erika A. Gary
*Attorney, Agent, or Firm*—Menlo Patent Agency LLC; David R. Gildea

[57] ABSTRACT

A communication system, method, and multiple master and slave transceivers having automatic addressing and collision avoidance. A master transceiver is programmed with its address by a user through a host. After being turned on, a slave transceiver acquires its address as the address of the first message it receives from a master transceiver. The master and the slave transceivers then communicate in each direction and ignore other messages by using that address until the slave transceiver is turned off. When the slave transceiver is turned on again, it acquires a new address of the address of the first new message it receives from a master transceiver, not necessarily the same master transceiver. The transceivers communicate with a signal having an on-condition having different lengths for representing different symbols. A transmitting transceiver detects a collision when it detects a signal on-condition during the longer of the different lengths while it is transmitting a signal on-condition of the shorter of the different lengths.

14 Claims, 3 Drawing Sheets

COMMUNICATION SYSTEM HAVING AUTOMATIC ADDRESSING

BACKGROUND OF THE INVENTION

1. Field of the Invention

The invention relates generally to communication systems and more particularly to a communication system having automatic addressing and collision avoidance.

2. Description of the Prior Art

Communication systems commonly use addresses for messages so that a transceiver can distinguish messages that it should receive from messages that it should ignore. Typically, a transceiver needs to know both a local address so that it can receive messages and one or more remote addresses of the transceivers to which it is expected to transmit messages. The local address in such transceiver is typically installed in the programming of an electronic memory, by hardwiring or cutting selected wires, by setting switch positions, or some similar means. A problem of such installation is that each transceiver must be customized for its own address, thereby increasing the cost of the transceiver. One solution to this problem is for a user in the field to install the local address into the transceiver. However, this solution merely transfers the cost of the custom installation to the user and is probably more likely to introduce errors. Similar problems are found in the installation of the remote addresses into the transceiver. There is a need for a communication system having addressed transceivers that automatically learn their local address and/or the remote addresses of the transceivers with which they are expected to communicate.

Any time multiple transceivers using the same signal format are within communication range, there is a possibility that two or more of the transceivers will transmit signals that interfere with each other. Many solutions to this problem are known. However, the known solutions tend to be specifically tailored for specific systems and to require a tradeoff between robustness and the effective throughput of data for the system. There continues to be a need for methods and hardware for collision avoidance in communication systems.

SUMMARY OF THE INVENTION

It is therefore an object of the present invention to provide a communication method and system having transceivers having automatic acquisition of addresses.

Another object is to provide a system and transceivers having a method for avoiding collisions when multiple transceivers are within communication range.

Briefly, in a preferred embodiment, the system includes several master and several slave transceivers. Each master transceiver is programmed with its address by a user through a host. After being turned on, the slave transceiver acquires as its address the address of the first message it receives from a master transceiver. The master and slave transceivers then communicate by using that address until the slave transceiver is turned off. When the slave transceiver is turned on again, it acquires a new address of the address of the first new message it receives from a master transceiver, not necessarily the same master transceiver. The transceivers communicate with a signal having on-conditions using different segments of a symbol transmission time for representing different symbols. A transmitting transceiver detects a collision when it detects a signal on-condition of a symbol using one segment while it is transmitting a signal of a symbol that does not use that segment for an on-condition.

An advantage of the present invention is that a slave transceiver does not require custom installation of its own address or the address of the particular master transceiver with which it is expected to communicate and a master transceiver does not require custom installation of the addresses of the slave transceivers with which it is expected to communicate.

Another advantage is that the collisions are detected and avoided even when multiple master transceivers and multiple slave transceivers are operating within communication range.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
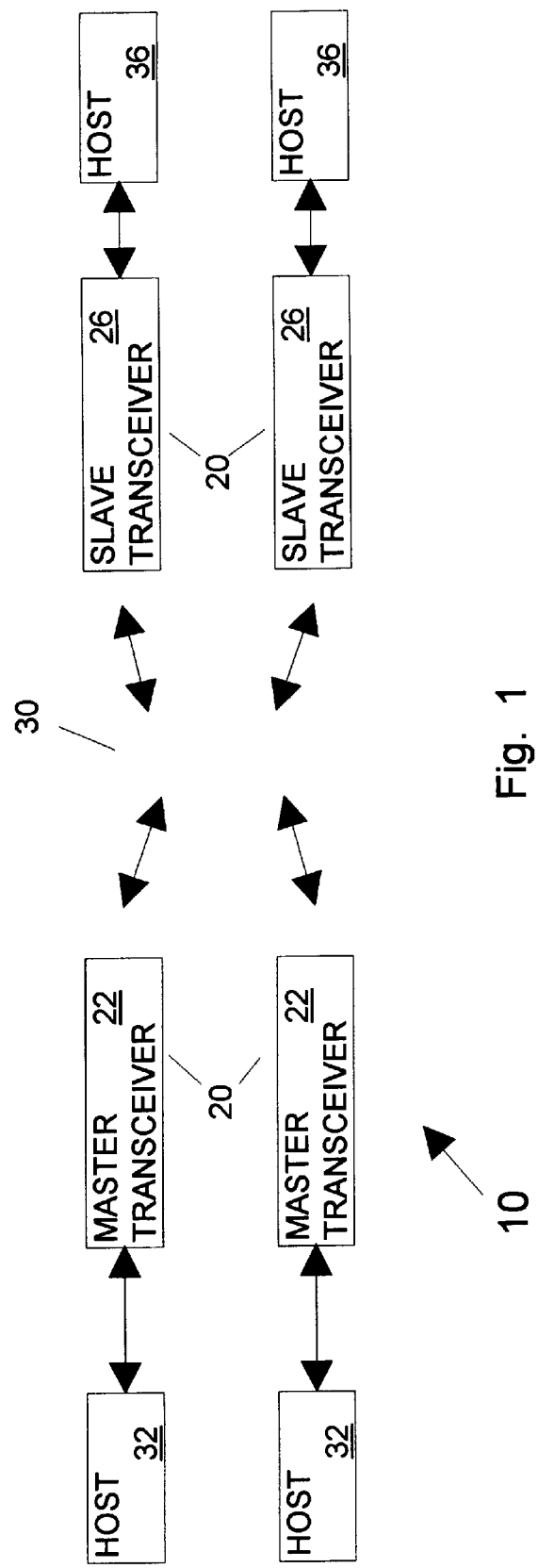
FIG. 1 is a block diagram of a communication system of the present invention.

FIG. 1 is a block diagram of a wireless communication system of the present invention and referred to by the general reference number 10. The system 10 includes several transceivers 20 configured as master transceivers 22 and slave transceivers 26 communicating with signals 30. There may be a great number of the master transceivers 22 and a great number of the slave transceivers 26 located within communication range of the signals 30. However, each of the slave transceivers 26 uses addressing for having a communicate link with only one of the master transceivers 22 and each of the master transceivers 22 uses addressing to know the slave transceivers 26 with which it is linked. The master transceivers 22 are electrically coupled to respective hosts 32 for exchanging information and the slave transceivers 26 are electrically coupled to respective hosts 36 for exchanging information. The master transceivers 22 may have identical electrical hardware and are programmed in manufacturing with identical internal executable codes and data. In operation the individual master transceivers 22 are distinguished only as a result of information received from the hosts 32 and in the signals 30. Similarly, the slave transceivers 26 may have identical electrical hardware and are programmed in manufacturing with identical internal executable codes and data. In operation the individual slave transceivers 26 are distinguished only as a result of information received in the signals 30 and from the hosts 36. However, the master transceiver 22 and the slave transceiver 26 differ in that the master transceiver 22 acquires its master address from the host 32 and includes the master address and an indication it is a master in the messages that it transmits; while the slave transceiver 26 acquires its slave address as the master address from the first master message received in the signals 30 each time power to the slave transceiver 26 is turned on and includes the slave address and an indication that it is a slave in the messages that it transmits. Thereafter, the master transceiver 22 receives slave messages in the signals 30 having its master address by passing the slave messages having its own master address to the host 32 and ignores other messages. The slave transceiver 26 receives master messages in the signals 30 having its own slave address by passing the master messages having its slave address to the host 36 and ignores other messages. In a typical application the individual hosts 32 have a display or a speaker, a keyboard or other user entry device for communicating with a human user, and a microcontroller for controlling the respective master transceivers 22 and performing pre-programmed computations based upon information received from the user and in the signals 30. The individual hosts 36 are typically transducers for taking a physical measurement or making a determination that is of interest to the user. For example, one or more of the hosts 26 may include a global positioning system (GPS) receiver for receiving GPS signals and determining a geographical location and one or more of the hosts 22 may be a user interface for the GPS receiver.

Figure 2:
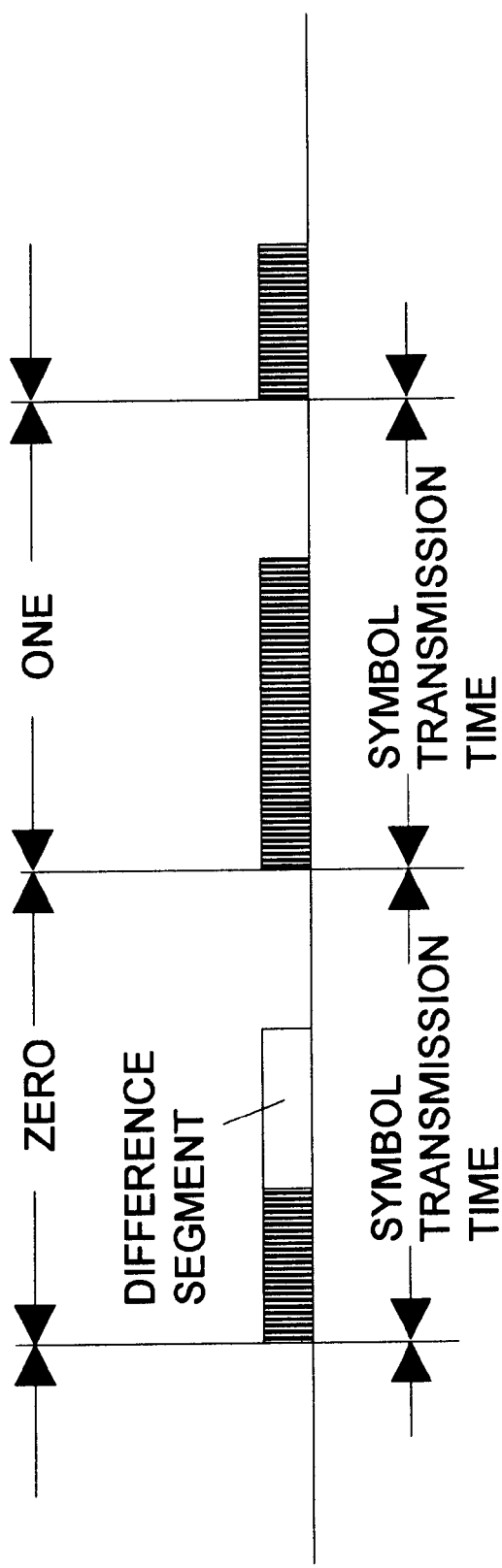
FIG. 2 is a signal diagram of a communication signal of the system of FIG. 1.

FIG. 2 illustrates a time line of the signals 30 for communicating between the master transceivers 22 and the slave transceivers 26. The signals 30 are organized in time periods where each time period is a symbol transmission time for one symbol. Symbols are distinguished by turning a carrier signal on and off in a prescribed manner. In a preferred embodiment, a symbol representing a "zero" is communicated by the on-condition of the carrier signal extending from the start through a segment of about one-third of the symbol transmission time and the off-condition of the carrier signal for the remainder. A symbol representing a "one" is communicated by the on-condition of the carrier signal extending from the start through a segment of about two-thirds of the symbol transmission time and the off-condition for the remainder. A segment of the symbol transmission time between the on-condition of the signal carrier communicating the "one" symbol and the on-condition of the signal carrier communicating the "zero" symbol is noted as a difference segment. Preferably, the signal transmission time is about 3.3 microseconds, the carrier frequency is about 13.65 megahertz, and the signals 30 are transmitted at a power level that is intended to be communicated in a wireless form for about 2 meters. Of course wired signals and other symbol transmission times, carrier frequencies, and/or power levels may be used. Furthermore, the signal 30 may carry symbols representing four or many more states by modulating the phase or amplitude of the signal carrier during the on-condition. Other time portions of the symbol transmission time may be used to represent symbols so long as at least one symbol uses a different on-condition time segment than at least one other symbol.

Figure 3:
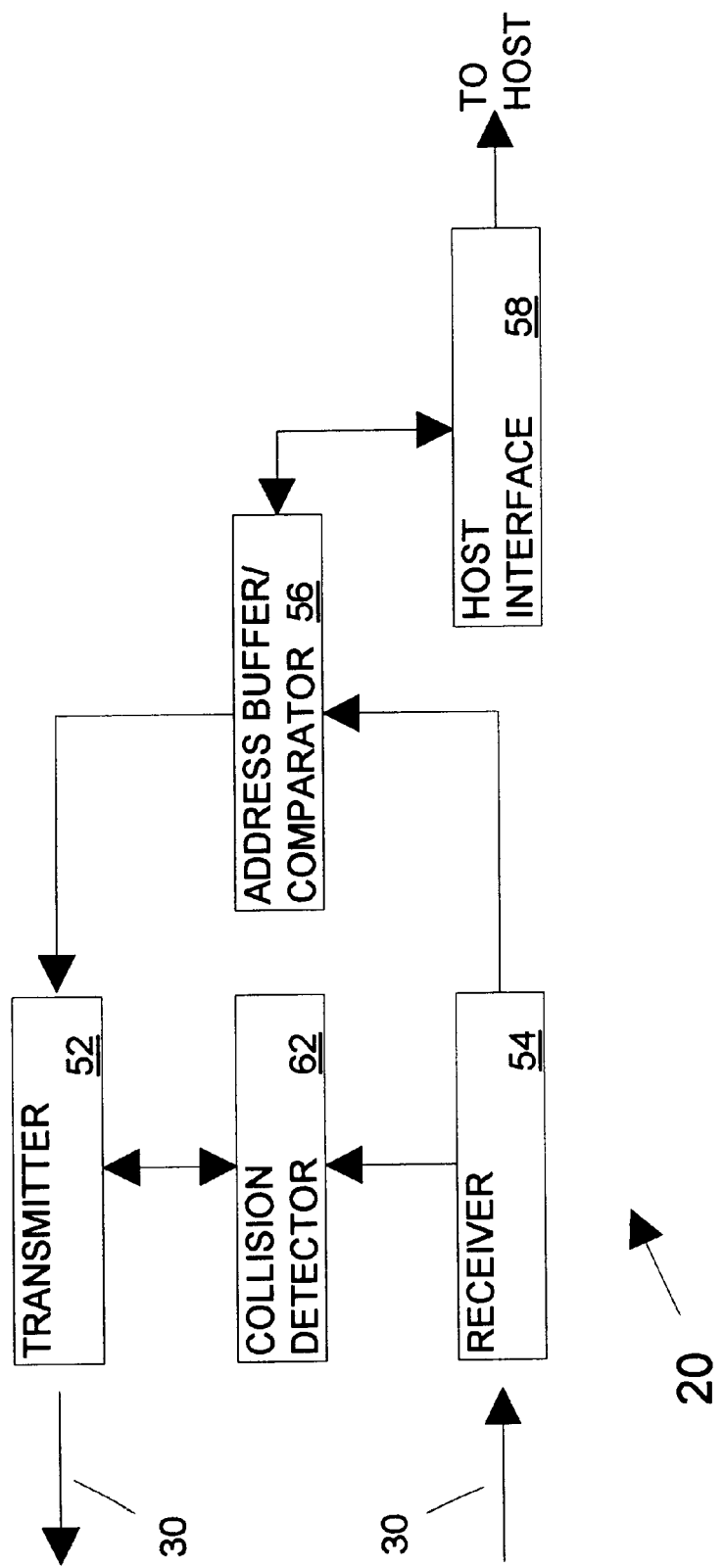
FIG. 3 is a block diagram of a transceiver of the system of FIG. 1.

FIG. 3 is a block diagram of the transceiver 20 representing the master transceivers 22 and the slave transceivers 26. The transceiver 20 includes a transmitter 52 and a receiver 54. The transmitter 52 includes electronic circuits for receiving data for a transmit message from an address buffer/comparator 56; formatting the data by framing, encrypting, adding forward error corrections, and/or scrambling; converting the formatted data into symbol data; generating a carrier signal; and modulating the symbol data onto the carrier signal for the signals 30 as illustrated in FIG. 2 and described in the accompanying detailed description. The receiver 54 includes electronic circuits for tuning to frequency of the signals 30; demodulating the symbols from the signals 30; converting symbol data into formatted data; de-formatting the formatted data by de-scrambling, decrypting, forward error correcting, and/or de-framing; and passing received de-formatted data in a message to the address buffer/comparator 56. The transmitter 52 and the receiver 54 may share a coupling network for combining and isolating the signals 30 that are transmitted and received to and from a common antenna. The address buffer/comparator 56 passes received message data and receives transmit message data to and from a host interface 58. The host interface 58 communicates the transmit and received message data with the hosts 32 or 36.

The address buffer/comparator 56 in the configuration for the master transceiver 22 stores an indication that it is a master as opposed to a slave and is programmed through the host interface 58 from the host 32 with a master address. Preferably, the master address has at least eight bits in order to minimize likelihood that two master transceivers within communication range will have the same master address. Transmit message date received from the host interface 58 is identified as a master message having the stored master address and then passed to the transmitter 52. Message data that is received from the receiver 54 is passed to the host interface 58 only when it is identified as a slave message having the stored master address. Other message data that is received is discarded.

The address buffer/comparator 56 in the configuration for the slave transceiver 26 stores an indication that it is a slave as opposed to a master and is programmed to acquire a slave address from the master address of the first master message that it receives from the receiver 54 after turn on. Thereafter, message data that is received from the receiver 54 is passed to the host interface 58 only when it is identified as a master message having the stored slave address and discarded otherwise. Message data that is to be transmitted is received from the host interface 58 is identified as a slave message having the stored slave address and then passed to the transmitter 52. When operating power to the slave transceiver 26 is turned off the slave address is discarded. When operating power to the slave transceiver 26 is turned on again, it acquires a new address from the new first master message that it receives. Thus, for a given power on cycle, each master transceiver 22 automatically communicates with a set of the slave transceivers 26 that are within its communication range without a requirement for a user to inform the master transceiver 22 of the slave addresses of the local slave transceivers 26 and each slave transceiver 22 automatically communicates with one and only one master transceiver 26 even when several master transceivers 26 are within its communication range. Furthermore, each master transceiver 22 and each slave transceiver 26 may be manufactured without individual programming for individual addresses. The address buffer/comparator 56 may be constructed so that the transceiver 20 may operate both in the configuration of the master transceiver 22 and as the slave transceiver 26. That is, the transceiver 20 may be configured for receiving a master address from the host 32 receiving the signals 30 having slave messages having a slave address of that master address; and as the slave transceiver 26 for receiving a master address in the signals 30 having the first master message that is received after turn on and then using the first master address as its slave address for receiving and transmitting slave messages.

The transceiver 20 includes a collision detector 62 operating with the receiver 54 to detect when the signals 30 are being received and to inhibit the transmitter 52 from transmitting when the received signals 30 are detected. When the signals 30 are being received from another transceiver 20, the collision detector 62 inhibits the transmitter 52 from beginning a transmission. However, it is possible that the transmitter 52 will begin transmitting the signals 30 at the same time that the other transceiver 20 begins transmitting, thereby causing a collision that may prevent the signals 30 from the local transceiver 20 and/or the other transceiver 20 from being communicated. In order to detect such collision and to prevent it from continuing, the collision detector 62 observes the signals 30 in order to detect the presence of a carrier signal during the difference segment (FIG. 2) of the signal transmission time between the segment of the signal transmission time that the transmitter 52 is transmitting a "one" symbol and the segment of the signal transmission time the transmitter 52 is transmitting a "zero" symbol. When the collision detector 62 detects the signal carrier during the difference segment, it inhibits the transmitter 52 from further transmission until it determines that the communication link is clear. A collision may continue when two or more transceivers 20 are all transmitting the "zero" symbol, however, eventually one of the transceivers 20 will transmit a "one" symbol and the other transceivers 20 will detect the collision.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A communication system comprising:
   at least one master transceiver for transmitting master messages, each of said master messages having an address for identifying the master transceiver transmitting said master message; and
   at least one slave transceiver for acquiring a particular address from a first of said master messages received unsolicited after turn on of the slave transceiver; receiving subsequent said master messages having said particular address and ignoring said subsequent master messages not having said particular address until the slave receiver is turned off; and acquiring a new address from a first of new said master messages received unsolicited after a new turn on of the slave transceiver and using said new address for receiving subsequent said new master messages having said new address and ignoring said subsequent new master messages not having said new master address.

2. The system of claim 1, wherein:
   the slave transceiver is further for identifying itself with the same said particular address and transmitting slave messages having said particular address; and
   the master transceiver identified by said particular address is further for receiving slave messages having said particular address and ignoring slave messages not having said particular address.

3. The system of claim 1, wherein:
   the slave transceiver is further for operating as another of the master transceiver.

4. The system of claim 1, wherein:
   the master transceiver is further for operating as another of the slave transceiver.

5. The system of claim 1, further including:
   a host for receiving a global positioning system (GPS) signal and passing GPS-based information determined from said GPS signal to the slave transceiver; and wherein:
   the slave transceiver is further for transmitting a slave message having said GPS-based information and said particular address.

6. A communication method for acquiring an address in a transceiver, comprising steps of:
   transmitting master messages, each of said master messages having an address for identifying a master transceiver transmitting said master message;
   in a slave transceiver, acquiring a particular address from a first of said master messages received unsolicited after turn on of said slave receiver;
   in said slave transceiver, receiving subsequent said master messages having said particular address and ignoring said subsequent master messages not having said particular address until the slave receiver is turned off;
   acquiring a new address from a first of new said master messages received after a new turn on of said slave transceiver;
   receiving subsequent said new master messages having said new address; and
   ignoring said subsequent new master messages not having said new address.

7. The method of claim 6, further comprising steps of:
   in said slave transceiver, identifying the slave transceiver with the same said particular address;
   transmitting slave messages having said particular address from said slave transceiver;
   in said master transceiver identified by said particular address, receiving said slave messages having said particular address; and
   ignoring slave messages not having said particular address.

8. The method of claim 6, further comprising steps of:
   from said slave transceiver, transmitting said master messages having a certain address for identifying said slave transceiver as a master transceiver.

9. The method of claim 6, further including steps of:
   in said master transceiver, acquiring said particular address from a first of said master messages received after turn on of said master receiver;
   receiving subsequent said master messages having said particular address; and
   ignoring said subsequent master messages not having said particular address.

10. The method of claim 6, further including steps of:
    receiving a global positioning system (GPS) signal;
    determining GPS-based information from said GPS signal;
    passing said GPS-determined information to said slave transceiver; and
    transmitting a slave message having said GPS-based information and said particular address from said slave transceiver.

11. A transceiver having collision avoidance, comprising:
    a transmitter for transmitting a certain signal having one of a first symbol and a second symbol during a certain symbol transmission time, said first symbol indicated by an on-condition during a first segment of said symbol transmission time, said second symbol indicated by said on-condition during a second segment of said symbol transmission time, at least a portion of said second segment not coincident with any portion of said first segment;
    a receiver for receiving said certain signal; and
    a collision detector coupled to the receiver and the transmitter for detecting a collision when said on-condition is detected during said portion of said second segment of said symbol transmission time while said first symbol is being transmitted.

12. The transceiver of claim 11, wherein:

said first symbol has said on-condition for a short segment of said symbol transmission time;

said second symbol has said on-condition for a long segment of said symbol transmission time; and the collision detector is for detecting said collision when said on-condition is detected during a difference segment between said long segment and said short segment while said first symbol is being transmitted.

13. A method of collision avoidance in a transceiver, comprising steps of:

transmitting a certain signal having one of a first symbol and a second symbol during a certain symbol transmission time, said first symbol indicated by an on-condition during a first segment of said symbol transmission time, said second symbol indicated by said on-condition during a second segment of said symbol transmission time, at least a portion of said second segment not coincident with any portion of said first segment;

receiving said certain signal; and detecting a collision when said on-condition is detected during said portion of said second segment of said symbol transmission time while said first symbol is being transmitted.

14. The method of claim 13, wherein:

said first symbol has said on-condition for a short segment of said symbol transmission time;

said second symbol has said on-condition for a long segment of said symbol transmission time; and the step of detecting includes a step of detecting said collision when said on-condition is detected during a difference segment between said long segment and said short segment while said first symbol is being transmitted.

* * * * *